US012477267B2

(12) United States Patent
Higgins et al.

(10) Patent No.: US 12,477,267 B2
(45) Date of Patent: Nov. 18, 2025

(54) HEARING DEVICE

(71) Applicant: Starkey Laboratories, Inc., Eden Prairie, MN (US)

(72) Inventors: Sidney A. Higgins, Maple Grove, MN (US); David Tourtelotte, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 321 days.

(21) Appl. No.: 18/121,317

(22) Filed: Mar. 14, 2023

(65) Prior Publication Data

US 2023/0300517 A1 Sep. 21, 2023

Related U.S. Application Data

(60) Provisional application No. 63/401,845, filed on Aug. 29, 2022, provisional application No. 63/320,017, filed on Mar. 15, 2022.

(51) Int. Cl.
*H04R 1/08* (2006.01)
*H04R 1/02* (2006.01)
(Continued)

(52) U.S. Cl.
CPC ............. *H04R 1/1083* (2013.01); *H04R 1/02* (2013.01); *H04R 1/08* (2013.01); *H04R 1/083* (2013.01);
(Continued)

(58) Field of Classification Search
CPC .......... H04R 1/1083; H04R 1/02; H04R 1/08; H04R 1/083; H04R 1/1016; H04R 1/2869;
(Continued)

(56) References Cited

U.S. PATENT DOCUMENTS 4,588,867 A * 5/1986 Konomi ................. H04R 17/02 381/151
8,331,593 B2 12/2012 Slemming
(Continued)

FOREIGN PATENT DOCUMENTS

WO WO 2021138647 A1 7/2021
WO WO 2021138648 A1 7/2021
WO WO 2023283569 A1 1/2023

OTHER PUBLICATIONS

European Patent Application No. 23161916.4, filed Mar. 14, 2023, European Search Report issued Jul. 18, 2023, 10 pages.

*Primary Examiner* — Carolyn R Edwards
*Assistant Examiner* — Friedrich Fahnert
(74) *Attorney, Agent, or Firm* — Mueting Raasch Group

(57) ABSTRACT

Various embodiments of a hearing device and a system including such device are disclosed. The hearing device can include an enclosure having a front housing and a rear housing, and an isolator disposed between the front housing and the rear housing. The isolator includes a body and a sleeve disposed on the body. The front housing and the rear housing are connected to the sleeve of the isolator. The device further includes a microphone disposed in the front housing, a receiver disposed in the rear housing, an acoustic port that extends through the isolator body between the receiver and an opening disposed in a first end of the front housing, and a microphone port that extends between the microphone and the opening disposed in the first end of the front housing.

22 Claims, 10 Drawing Sheets

(51) Int. Cl.
*H04R 1/10* (2006.01)
*H04R 1/28* (2006.01)

(52) U.S. Cl.
CPC ......... *H04R 1/1016* (2013.01); *H04R 1/2869* (2013.01); *H04R 2460/01* (2013.01)

(58) Field of Classification Search
CPC .............. H04R 2460/01; H04R 25/604; H04R 2225/0216; H04R 25/456
USPC .......................................................... 381/71.6
See application file for complete search history.

(56) References Cited

U.S. PATENT DOCUMENTS

| | | | | |
|---|---|---|---|---|
| 8,494,193 | B2 | 7/2013 | Zhang | |
| 8,958,586 | B2 | 2/2015 | Preves | |
| 9,002,045 | B2 | 4/2015 | Merks | |
| 9,042,586 | B2 | 5/2015 | Burns | |
| 9,197,970 | B2 | 11/2015 | Zhang | |
| 9,264,824 | B2 | 2/2016 | Pruthi | |
| 9,294,849 | B2 | 3/2016 | Burns | |
| 9,641,942 | B2 | 5/2017 | Strelcyk | |
| 9,699,573 | B2 | 7/2017 | Merks | |
| 9,940,928 | B2 | 4/2018 | Haubrich | |
| 9,949,041 | B2 | 4/2018 | Liao | |
| 9,980,065 | B2 | 5/2018 | Higgins | |
| 10,129,664 | B2 | 11/2018 | Fitz | |
| 10,674,285 | B2 | 6/2020 | Walsh | |
| 11,323,828 | B2 | 5/2022 | Roug | |
| 2002/0122563 | A1 | 9/2002 | Schumaier | |
| 2007/0036379 | A1 | 2/2007 | Anderson | |
| 2020/0152227 | A1 | 5/2020 | Xiang | |
| 2020/0205745 | A1 | 7/2020 | Khosousi | |
| 2020/0219506 | A1 | 7/2020 | Bhowmik | |
| 2020/0219515 | A1 | 7/2020 | Bhowmik | |
| 2020/0245938 | A1 | 8/2020 | Xu | |
| 2020/0268265 | A1 | 8/2020 | Walsh | |
| 2020/0268315 | A1 | 8/2020 | Burwinkel | |
| 2021/0044909 | A1 | 2/2021 | Higgins | |
| 2022/0335924 | A1 * | 10/2022 | Qin ........................ | H04R 1/406 |
| 2023/0134787 | A1 * | 5/2023 | Chen .................. | G10K 11/1783 381/71.6 |

* cited by examiner

HEARING DEVICE

This application claims the benefit of U.S. Provisional Application No. 63/320,017, filed Mar. 15, 2022, and U.S. Provisional Application No. 63/401,845, filed Aug. 29, 2022, the disclosures of which are incorporated by reference herein in their entireties.

BACKGROUND

Hearing devices that are disposed in an ear of a wearer or inserted into an opening of an ear canal of the wearer typically include a housing or shell with electronic components such as a receiver (i.e., speaker) disposed within the housing. The receiver is adapted to provide acoustic information in the form of acoustic energy to the wearer's ear canal from a controller either disposed within the housing of the hearing device or connected to the hearing device by a wired or wireless connection. This acoustic information can include music or speech from a recording or other source. In hearing devices such as hearing assistance devices, the acoustic information provided to the wearer can include ambient sounds such as speech from a person or persons that are speaking in proximity to the wearer. Such speech can be amplified so that the wearer can better hear the speaker. Some hearing devices also include a microphone disposed within the housing. Such microphone can be utilized to detect the wearer's voice and provide a microphone signal to the receiver, which in turn provides acoustic energy to the ear that includes an amplified version of the wearer's voice.

SUMMARY

In general, the present disclosure provides various embodiments of a hearing device and a system that includes such device. The hearing device can include an enclosure having a front housing and a rear housing. An isolator is disposed between the front and rear housings. The isolator can include a body and a sleeve disposed on the body. An acoustic port extends through the isolator body of the isolator between a receiver disposed within the rear housing and an opening disposed in a first end of the front housing. The acoustic port acoustically connects the receiver to the opening. Further, a microphone port extends between a microphone disposed in the front housing and the opening. The microphone port acoustically connects the microphone to the opening. In one or more embodiments, the isolator can be adapted to reduce vibrations caused by the receiver that can affect a microphone signal produced by the microphone.

In one aspect, the present disclosure provides a hearing device that includes an enclosure extending along an enclosure axis and including a front housing and a rear housing, where the front housing extends along the enclosure axis between a first end and a second end, and further where the rear housing extends along the enclosure axis between a first end and a second end; an isolator disposed between the front housing and the rear housing, where the isolator includes a body and a sleeve disposed on a side surface of the body, where the second end of the front housing and the second end of the rear housing are connected to the sleeve of the isolator; and a microphone disposed in the front housing. The hearing device further includes a receiver disposed in the rear housing; an acoustic port that extends through the isolator body between the receiver and an opening disposed in the first end of the front housing, where the acoustic port acoustically connects the receiver to the opening; and a microphone port that extends between the microphone and the opening disposed in the first end of the front housing, where the microphone port acoustically connects the microphone to the opening.

In another aspect, the present disclosure provides a hearing device system that includes a hearing device, a hearing module, and a cable that connects the hearing device to the hearing module. The hearing device includes an enclosure extending along an enclosure axis and including a front housing and a rear housing, where the front housing extends along the enclosure axis between a first end and a second end, and further where the rear housing extends along the enclosure axis between a first end and a second end; an isolator disposed between the front housing and the rear housing, where the isolator includes a body and a sleeve disposed on a side surface of the body, where the second end of the front housing and the second end of the rear housing are connected to the sleeve of the isolator; and a microphone disposed in the front housing. The hearing device further includes a receiver disposed in the rear housing; an acoustic port that extends between the receiver and an opening disposed in the first end of the front housing, where the acoustic port acoustically connects the receiver to the opening; and a microphone port that extends between the microphone and the opening disposed in the first end of the front housing, where the microphone port acoustically connects the microphone to the opening. Further, the hearing module is adapted to be disposed between an ear and a skull of a wearer, where the hearing module includes a module housing and electronic components disposed within the module housing.

In another aspect, the present disclosure provides a method that includes forming a body of an isolator; disposing a sleeve onto a side surface of the body of the isolator; and disposing a microphone within a front housing, where the front housing includes a first end and a second end. The method further includes disposing a receiver within a rear housing, where the rear housing includes a first end and a second end; connecting the second end of the front housing to the sleeve of the isolator; and connecting the second end of the rear housing to the sleeve of the isolator, where the front housing, the isolator, and the rear housing define an enclosure that extends along an enclosure axis.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. The term "consisting of" means "including," and is limited to whatever follows the phrase "consisting of." Thus, the phrase "consisting of" indicates that the listed elements are required or mandatory and that no other elements may be present. The term "consisting essentially of" means including any elements listed after the phrase and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

In this application, terms such as "a," "an," and "the" are not intended to refer to only a singular entity, but include the general class of which a specific example may be used for having Illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
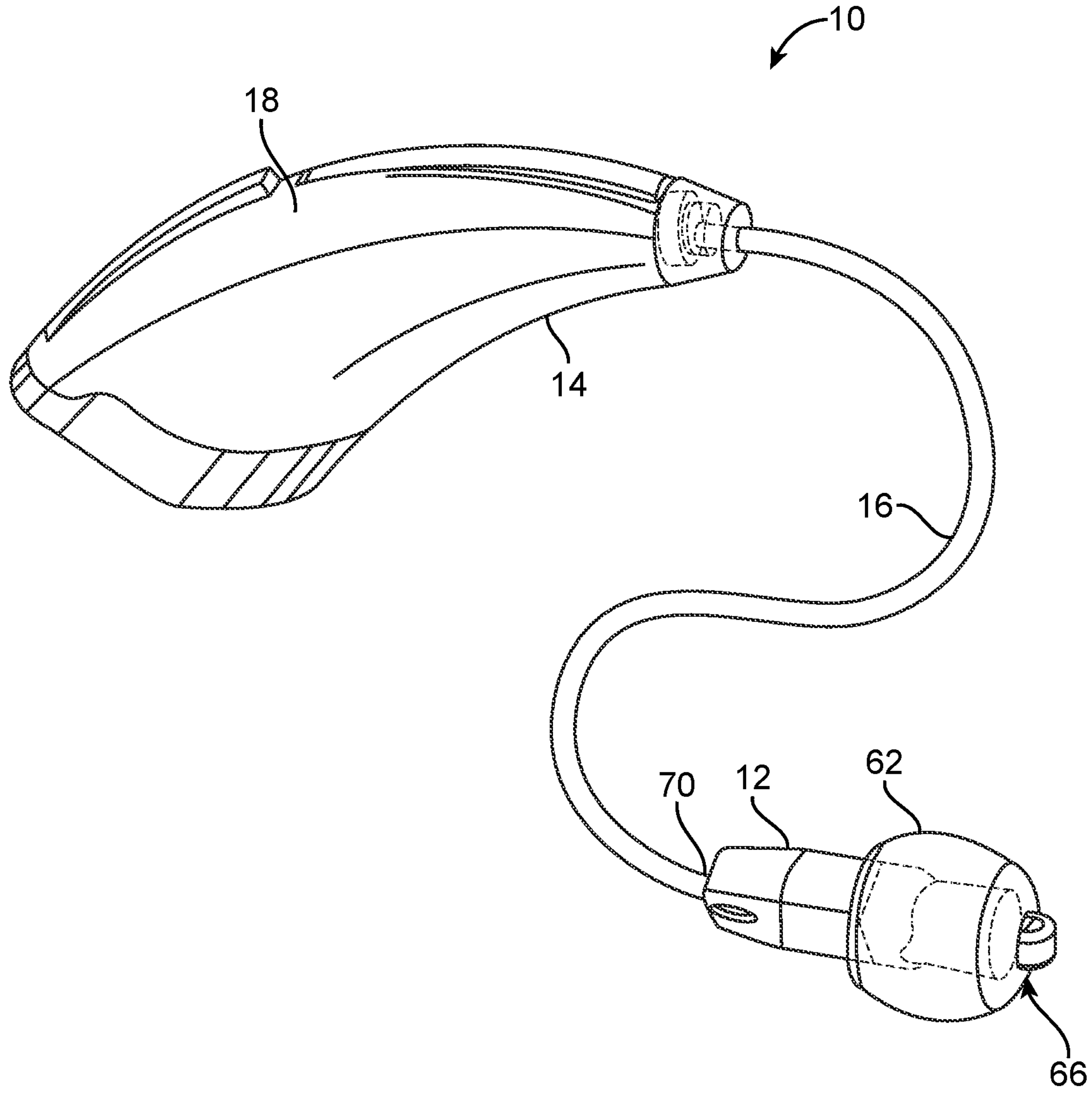
FIG. 1 is a schematic perspective view of one embodiment of a hearing device system that includes a hearing device and a hearing module connected to the hearing device by a cable.
Figure 2:
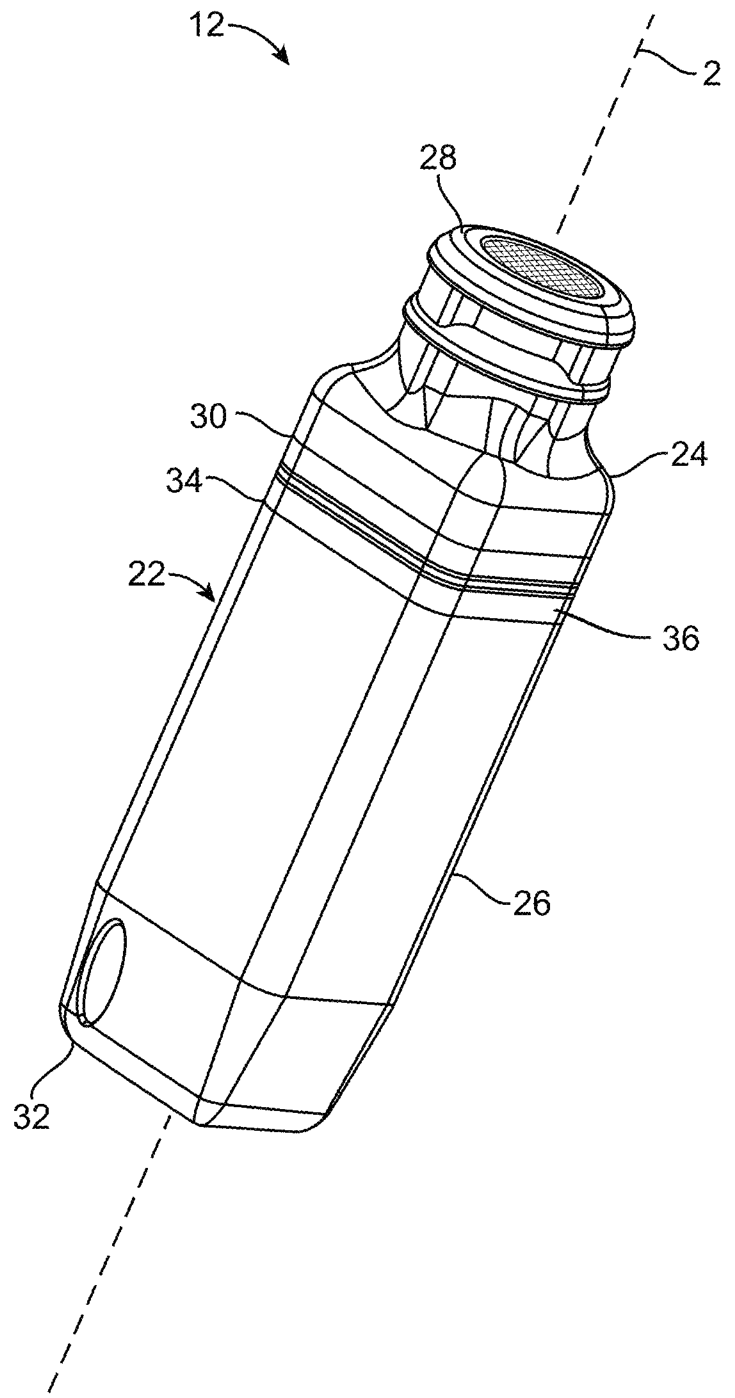
FIG. 2 is a schematic perspective view of the hearing device of FIG. 1.

In general, the present disclosure provides various embodiments of a hearing device and a system that includes such device. The hearing device can include an enclosure having a front housing and a rear housing. An isolator is disposed between the front and rear housings. The isolator can include a body and a sleeve disposed on the body. An acoustic port extends through the isolator body of the isolator between a receiver disposed within the rear housing and an opening disposed in a first end of the front housing. The acoustic port acoustically connects the receiver to the opening. Further, a microphone port extends between a microphone disposed in the front housing and the opening. The microphone port acoustically connects the microphone to the opening. In one or more embodiments, the isolator can be adapted to reduce vibrations caused by the receiver that can affect a microphone signal produced by the microphone.

Currently-available in-ear hearing devices that include a microphone disposed within a housing of the device and directed toward an ear canal of the wearer have the microphone disposed in a planar manner on top of a receiver also disposed within the housing. Such configuration can, however, require larger custom earbuds that can make it difficult to fit ear canals of various wearers. Further, vibrations from the receiver can be picked up by the microphone, thereby reducing a signal to noise ratio of the microphone signal. These receiver vibrations can either be directly from the receiver and/or from the housing that vibrates in response to the receiver.

One or more embodiments of hearing devices described herein can exhibit various advantages over known hearing devices. For example, the isolator that is disposed between the front and rear housings can reduce vibrations from the receiver and the enclosure. Such vibration reduction can enable placement of the microphone inside the front housing without an increase in noise in the microphone signal that can be caused by vibration of the receiver. The isolator can include the body and the sleeve disposed on the body. In one or more embodiments, the sleeve can be over-molded onto the body, which can enhance robustness of the isolator and the enclosure of the device and increase manufacturability of the device. Further, additional functionalities of the hearing device can be enhanced by this reduction of receiver vibration as the microphone can be placed forward of the receiver and thus further into the ear canal. For example, circuitry disposed within the hearing device or connected to the device by a wired or wireless connection can perform, e.g., active noise cancellation, self-fit testing, heartbeat monitoring, occlusion suppression, respiration rate monitoring, etc., based upon acoustic information provided by the microphone.

Embodiments of the disclosure are defined in the claims; however, herein there is provided a non-exhaustive listing of non-limiting examples. Any one or more of the features of these examples may be combined with any one or more features of another example, embodiment, or aspect described herein.

Example Ex1. A hearing device that includes an enclosure extending along an enclosure axis and including a front housing and a rear housing, where the front housing extends along the enclosure axis between a first end and a second end, and further where the rear housing extends along the enclosure axis between a first end and a second end; an isolator disposed between the front housing and the rear housing, where the isolator includes a body and a sleeve disposed on a side surface of the body, where the second end of the front housing and the second end of the rear housing are connected to the sleeve of the isolator; and a microphone disposed in the front housing. The hearing device further includes a receiver disposed in the rear housing; an acoustic port that extends through the isolator body between the receiver and an opening disposed in the first end of the front housing, where the acoustic port acoustically connects the receiver to the opening; and a microphone port that extends between the microphone and the opening disposed in the first end of the front housing, where the microphone port acoustically connects the microphone to the opening.

Example Ex2. The device of Ex1, where the sleeve is over-molded onto the side surface of the body of the isolator.

Example Ex3. The device of one or more of Ex1 to Ex2, where the isolator includes a flange that extends from the side surface, where the sleeve is in contact with the flange.

Example Ex4. The device of Ex3, where the sleeve includes a first portion that is connected to the front housing and a second portion that is connected to the rear housing, where the flange is disposed between the first portion and the second portion of the sleeve.

Example Ex5. The device of one or more of Ex1 to Ex4, where the front housing includes a slot disposed in an inner surface of the front housing, where the slot is adapted to receive the microphone.

Example Ex6. The device of one or more of Ex1 to Ex5, where the body of the isolator includes at least one of a thermoplastic polymer, thermoset polymer, thermoplastic elastomer, or photopolymer.

Example Ex7. The device of one or more of Ex1 to Ex6, where the body of the isolator includes a hardness value of at least 20 durometer Shore 00.

Example Ex8. The device of one or more of Ex1 to Ex7, where the body of the isolator includes a hardness value of no greater than 80 durometer Shore A.

Example Ex9. The device of one or more of Ex1 to Ex8, where a hardness value of the sleeve of the isolator is greater than a hardness value of the body of the isolator.

Example Ex10. The device of one or more of Ex1 to Ex9, further including an earbud connected to the first end of the front housing.

Example Ex11. The device of Ex10, where the front housing includes a concentric flange disposed on an outer surface of the front housing, where the concentric flange is adapted to engage the earbud.

Example Ex12. The device of one or more of Ex10 to Ex11, where an opening in the earbud is aligned along the enclosure axis with the opening in the first end of the front housing.

Example Ex13. The device of one or more of Ex1 to Ex12, where the sleeve of the isolator further includes a first rib that extends toward the first end of the front housing along the enclosure axis, where the first rib is adapted to be inserted into the second end of the front housing.

Example Ex14. The device of Ex13, where the sleeve of the isolator further includes a second rib extending toward the first end of the rear housing along the enclosure axis, where the second rib is adapted to be inserted into the first end of the rear housing.

Example Ex15. The device of Ex14, where the sleeve of the isolator further includes a ledge that extends from the first rib to a perimeter of the sleeve, where an end surface of the second end of the front housing is adapted to engage the ledge.

Example Ex16. The device of Ex15, where the sleeve of the isolator further includes a second ledge that extends from the second rib to the perimeter of the sleeve, where an end surface of the second end of the rear housing is adapted to engage the ledge.

Example Ex17. The device of one or more of Ex1 to Ex16, where an inlet of the microphone port defines a plane that is orthogonal to the enclosure axis, where a distance between an outlet of the acoustic port and the plane is no greater than 1.2 mm as measured in a direction parallel to the enclosure axis.

Example Ex18. The device of one or more of Ex1 to Ex17, where the microphone further includes a manifold that extends along the enclosure axis and defines a portion of the acoustic port.

Example Ex19. The device of one or more of Ex1 to Ex18, further including a connector port disposed in the first end of the rear housing and adapted to receive an end of a cable.

Example Ex20. A hearing device system that includes a hearing device, a hearing module, and a cable that connects the hearing device to the hearing module. The hearing device includes an enclosure extending along an enclosure axis and including a front housing and a rear housing, where the front housing extends along the enclosure axis between a first end and a second end, and further where the rear housing extends along the enclosure axis between a first end and a second end; an isolator disposed between the front housing and the rear housing, where the isolator includes a body and a sleeve disposed on a side surface of the body, where the second end of the front housing and the second end of the rear housing are connected to the sleeve of the isolator; and a microphone disposed in the front housing. The hearing device further includes a receiver disposed in the rear housing; an acoustic port that extends between the receiver and an opening disposed in the first end of the front housing, where the acoustic port acoustically connects the receiver to the opening; and a microphone port that extends between the microphone and the opening disposed in the first end of the front housing, where the microphone port acoustically connects the microphone to the opening. Further, the hearing module is adapted to be disposed between an ear and a skull of a wearer, where the hearing module includes a module housing and electronic components disposed within the module housing.

Example Ex21. The system of Ex20, where the electronic components of the hearing module include a controller that is operatively connected to the hearing device.

Example Ex22. The system of Ex21, where the controller is adapted to direct a noise canceling signal to the receiver of the hearing device that is based upon a noise signal received from the microphone of the hearing device, where the receiver is adapted to direct a noise canceling acoustic wave into an ear canal of the wearer of the hearing device that is based upon the noise canceling signal from the controller.

Example Ex23. The system of Ex21, where the controller is adapted to determine a fit of the hearing device in an ear canal of the wearer based upon a feedback signal from the microphone of the hearing device in response to a fit-test acoustic wave directed into the ear canal by the receiver.

Example Ex24. The system of Ex21, where the controller is adapted to measure a pulse rate of the wearer based upon a pulse signal received from the microphone of the hearing device, where the pulse signal is based upon a pulse detected by the microphone.

Example Ex25. The system of Ex21, where the controller is adapted to measure an occlusion value of the hearing device in the ear canal of the wearer based upon an occlusion signal received from the microphone of the hearing device in response to an acoustic wave directed into the ear canal by the receiver and detected by the microphone.

Example Ex26. A method that includes forming a body of an isolator; disposing a sleeve onto a side surface of the body of the isolator; and disposing a microphone within a front housing, where the front housing includes a first end and a second end. The method further includes disposing a receiver within a rear housing, where the rear housing includes a first end and a second end; connecting the second end of the front housing to the sleeve of the isolator; and connecting the second end of the rear housing to the sleeve of the isolator, where the front housing, the isolator, and the rear housing define an enclosure that extends along an enclosure axis.

Example Ex27. The method of Ex26, where forming the body of the isolator includes molding the body of the isolator.

Example Ex28. The method of one or more of Ex26 to Ex27, where disposing a sleeve onto the side surface of the body of the isolator includes over-molding the sleeve onto the side surface of the body of the isolator.

Example Ex29. The method of one or more of Ex26 to Ex28, further including disposing an opening through the body of the isolator.

Example Ex30. The method of Ex29, further including disposing an acoustic port within the enclosure between the receiver and an opening disposed in the first end of the front housing, where the opening in the body of the isolator defines a portion of the acoustic port, and further where the acoustic port acoustically connects the receiver and the opening.

Example Ex31. The method of Ex30, further including disposing a microphone port between the microphone and the opening in the first end of the front housing, where the microphone port acoustically connects the microphone and the opening.

Example Ex32: A hearing device that includes an enclosure extending along an enclosure axis and including a front housing and a rear housing, where the front housing extends along the enclosure axis between a first end and a second end, and further where the rear housing extends along the enclosure axis between a first end and a second end. The device further includes an isolator disposed between the front housing and the rear housing. The isolator includes a body and a sleeve disposed on a side surface of the body. The second end of the front housing and the second end of the rear housing are connected to the sleeve of the isolator.

Example Ex33: The device of one or more of Ex1 to Ex19, further including a second sensor disposed in the rear housing.

Example Ex34: The hearing device of Ex33, where the second sensor includes a second microphone.

Example Ex35: The hearing device of one or more of Ex33 to Ex34, further comprising a second isolator disposed in the rear housing and adapted to isolate the receiver from the second sensor.

FIG. 1 is a schematic perspective view of one embodiment of a hearing device system 10. The system 10 includes a hearing device 12, a hearing module 14, and a cable 16 that connects the hearing device to the hearing module. The hearing module 14 is adapted to be disposed between an ear and a skull of a wearer. As is further described herein, the hearing module 14 includes a module housing 18 and electronic components (electronic components 20 of FIG. 8) disposed within the module housing.

The hearing device 12 can include any suitable device that can provide acoustic energy to a wearer using any suitable technique or techniques, e.g., by directing sound into the ear of the wearer, bone conduction, implants, etc. In one or more embodiments, the hearing device 12 can include over-the-ear or in-ear headphones, an earpiece, etc. Further, in one or more embodiments, the system 10 can include a hearing assistance device such as behind-the-ear (BTE), in-the-ear (ITE), in-the-canal (ITC), or completely-in-the-canal (CIC) type hearing devices. It is understood that behind-the-ear type hearing devices can reside substantially behind the ear or over the ear. Such devices can include receivers associated with an electronics portion of the behind-the-ear device, or receivers disposed in the ear canal of the user. Such devices are also known as receiver-in-the-canal (RIC) or receiver-in-the-ear (RITE) hearing devices.

As shown in FIGS. 2-8, the hearing device 12 includes an enclosure 22 that extends along an enclosure axis 2. The enclosure 22 includes a front housing 24 and a rear housing 26. The front housing 24 extends along the enclosure axis 2 between a first end 28 and a second end 30. Further, the rear housing 26 extends along the enclosure axis 2 between a first end 32 and a second end 34.

Figure 4:
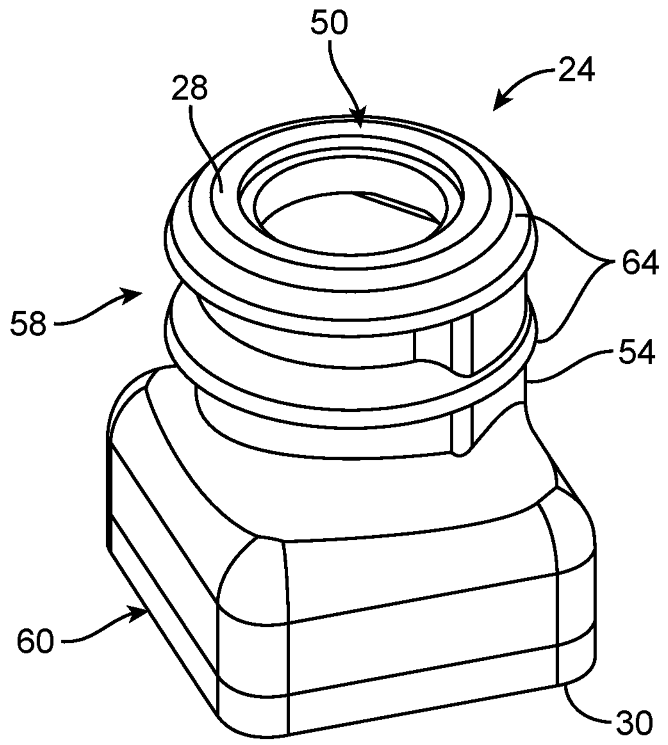
FIG. 4 is a side perspective view of a front housing of an enclosure of the hearing device of FIG. 1.

The device 12 also includes an isolator 36 disposed between the front housing 24 and the rear housing 26. The isolator 36 includes a body 38 and a sleeve 40 disposed on the body (FIG. 4). In one or more embodiments, the sleeve 40 is disposed on a side surface 42 (FIG. 7) of the body 38. The second end 30 of the front housing 24 and the second end 34 of the rear housing 26 are connected to the sleeve 40 of the isolator 36.

Figure 3:
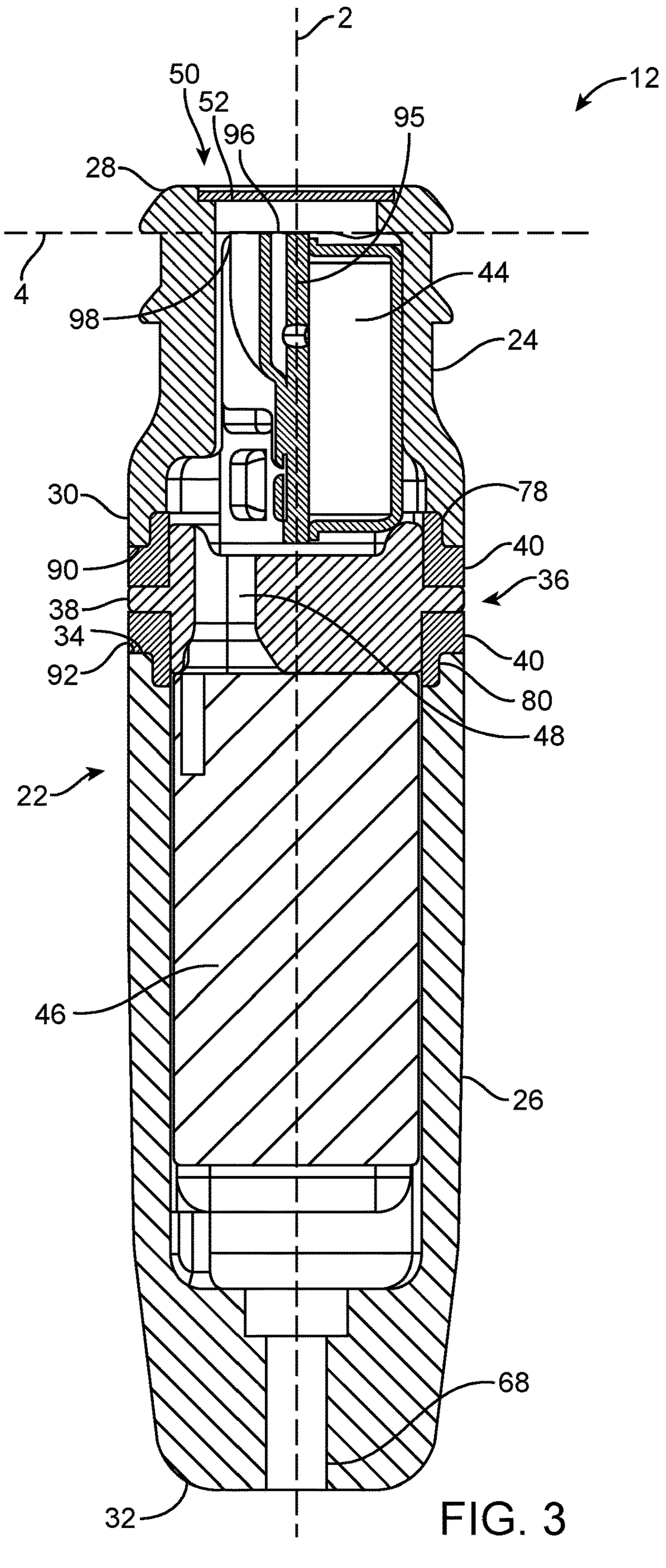
FIG. 3 is a schematic cross-section view of the hearing device of FIG. 1.

Any suitable electronic components can be disposed within the enclosure 22. As shown in FIG. 3, the hearing device 12 includes a sensor 44 disposed in the front housing 24 and a receiver 46 disposed in the rear housing 26. In one or more embodiments, the sensor 44 includes a microphone (referred to herein as microphone 44). Although depicted as including the microphone 44 and the receiver 46, in one or more embodiments, one or more additional components and/or circuitry can be disposed within the enclosure 22, e.g., at least one of a sensor, controller, amplifier, filter, GMR, switch, or outward facing microphone. The device 12 further includes an acoustic port 48 that extends through the isolator body 38 between the receiver 46 and an opening 50 disposed in the first end 28 of the front housing 24. The acoustic port 48 acoustically connects the receiver 46 to the opening 50, i.e., the acoustic port is adapted to direct acoustic energy between the receiver and the opening. Further, the device 12 includes a microphone port 52 that extends between the microphone 44 and the opening 50 disposed in the first end 28 of the front housing 24. The microphone port 52 acoustically connects the microphone 44 to the opening 50.

The front housing 24 of the enclosure 22 extends along the enclosure axis 2 between the first end 28 and the second end 30. The front housing 24 can take any suitable shape and have any suitable dimensions. In one or more embodiments, the front housing 24 is sized such that at least a portion of its first end 28 can be disposed within an opening of the ear canal of the wearer. As shown in FIG. 4, the front housing 24 can include a first portion 58 and a second portion 60. The first portion 58 can be adapted to be at least partially disposed within the opening of the ear canal, and the second portion 60 can be adapted to be connected to the isolator 36.

In one or more embodiments, the hearing device 12 can include an earbud 62 (FIG. 1) connected to the first end 28 of the front housing 24. The earbud 62 can take any suitable shape and having any suitable dimensions. In one or more embodiments, the earbud 62 is integral with the front housing 24, i.e., formed as a single part with the front housing during the manufacturing process. In one or more embodiments, the earbud 62 can be manufactured separately from the front housing 24 and connected to the front housing using any suitable technique. The earbud 62 includes an opening 66 that is aligned along the enclosure axis 2 with the opening 50 in the first end 28 of the front housing 24.

The front housing 24 can include one or more flanges 64 (FIG. 4) that are adapted to retain the earbud 62. The front housing 24 can include any suitable number of flanges 64. Further, each flange 64 can take any suitable shape and have any suitable dimensions. In one or more embodiments, one or more of the flanges 64 can be a concentric flange.

Figure 5:
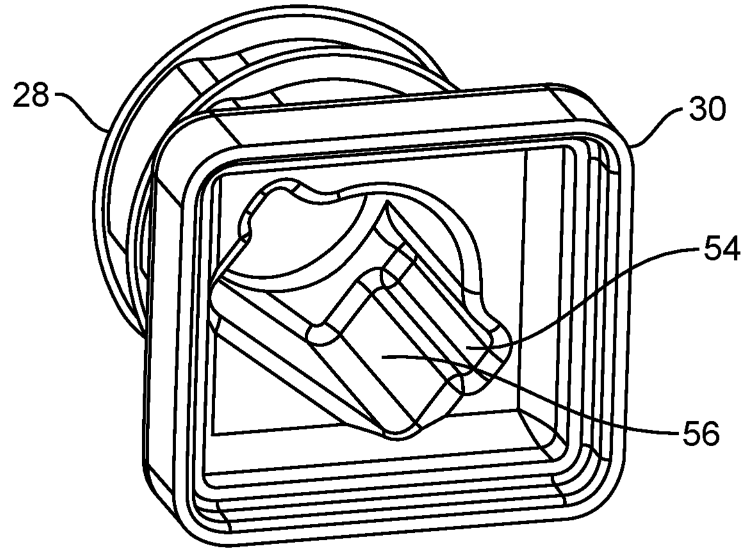
FIG. 5 is a schematic rear perspective view of the front housing of FIG. 4.

As shown in FIGS. 4-5, the front housing 24 can also include a slot 54 that is disposed in an inner surface 56 of the front housing. The slot 54 is adapted to receive the microphone 44 and can take any suitable shape and have any suitable dimensions. In one or more embodiments, the slot 54 extends in a direction parallel to the enclosure axis 2.

The front housing 24 can include any suitable material, e.g., at least one of a polymeric material, metallic material, or ceramic material. Suitable polymeric materials include thermoplastic polymers (e.g., thermoplastic polyurethanes, thermoplastic elastomers), thermoset polymers, photopolymers, etc. In one or more embodiments, the front housing 24 can include the same material as the rear housing 26. Further, in one or more embodiments, the front housing 24 can include the same material as the material of the body 38 of the isolator. Further, the front housing 24 can be manufactured utilizing any suitable technique, e.g., molding, injection molding, 3D printing, die-casting, metal injection molding, sintering, stamping, casting, etc.

As mentioned herein, the rear housing 26 of the enclosure 22 extends along the enclosure axis 2 between the first end 32 and the second end 34. The rear housing 26 can take any suitable shape have any suitable dimensions. Further, the rear housing 26 can include any suitable material, e.g., at least one of a polymeric material, metallic material, or ceramic material. Suitable polymeric materials include thermoplastic polymers (e.g., thermoplastic polyurethanes, thermoplastic elastomers), thermoset polymers, photopolymers, etc. In one or more embodiments, the rear housing 26 can include the same material as the front housing 24. Further, in one or more embodiments, the rear housing 26 can include the same material as the material of the body 38 of the isolator 36. Further, the rear housing 26 can be manufactured utilizing any suitable technique, e.g., molding, injection molding, 3D printing, die-casting, metal injection molding, sintering, stamping, casting, etc.

The rear housing 26 can include a connector port 68 (FIG. 3) disposed in the first end 32 of the rear housing that extends between the first end and the receiver 46 disposed within the rear housing. The connector port 68 can be adapted to receive an end 70 of the cable 16 (FIG. 1) that connects the hearing device 12 to the hearing module 14 such that the cable can connect the receiver, the microphone 44, and any other circuitry disposed within the enclosure 22 to circuitry disposed within the hearing module 14.

The front housing 24 and the rear housing 26 can be connected using any suitable technique to provide the enclosure 22. For example, the isolator 36 can be disposed between the front housing 24 and the rear housing 26, where the front housing and the rear housing are connected to the isolator. The second end 30 of the front housing 24 and the second end 34 of the rear housing 26 are connected to the isolator 36 using any suitable technique, e.g., bonding, adhering including adhesive bonding and adhesive tapes, welding, friction-fitting, snap fitting, etc. The front and rear housings 24, 26 can be connected to any suitable portion or portions of the isolator 36. In one or more embodiments, one or both of the front housing 24 and rear housing 26 can be removably connected to the isolator 36 such that front and rear housings can be replaced. Such removable connection between the front and rear housings 24, 26 and the isolator 36 can provide a modular hearing device 12.

Figure 7:
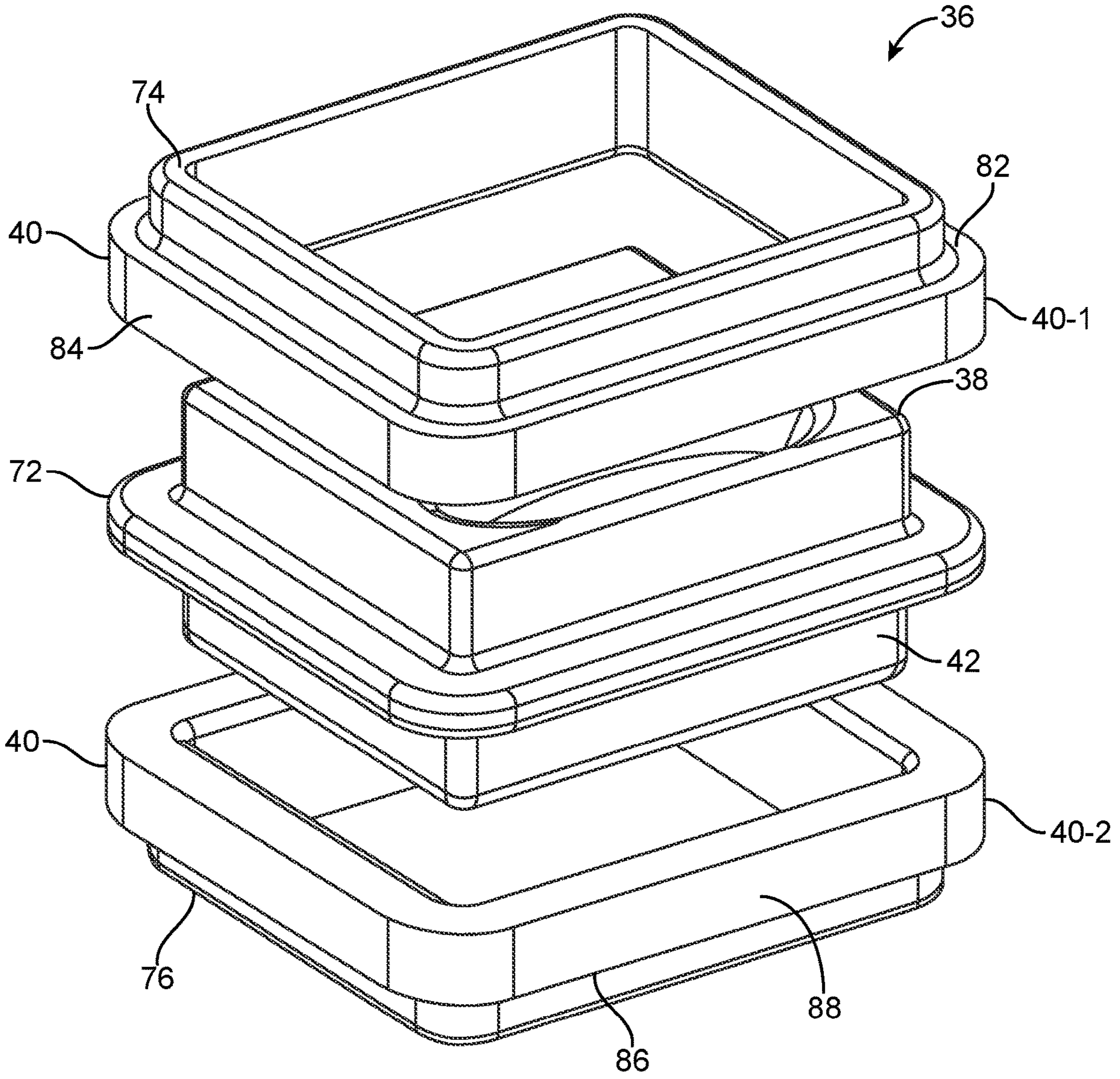
FIG. 7 is an exploded view of the isolator of FIG. 6.
Figure 8:
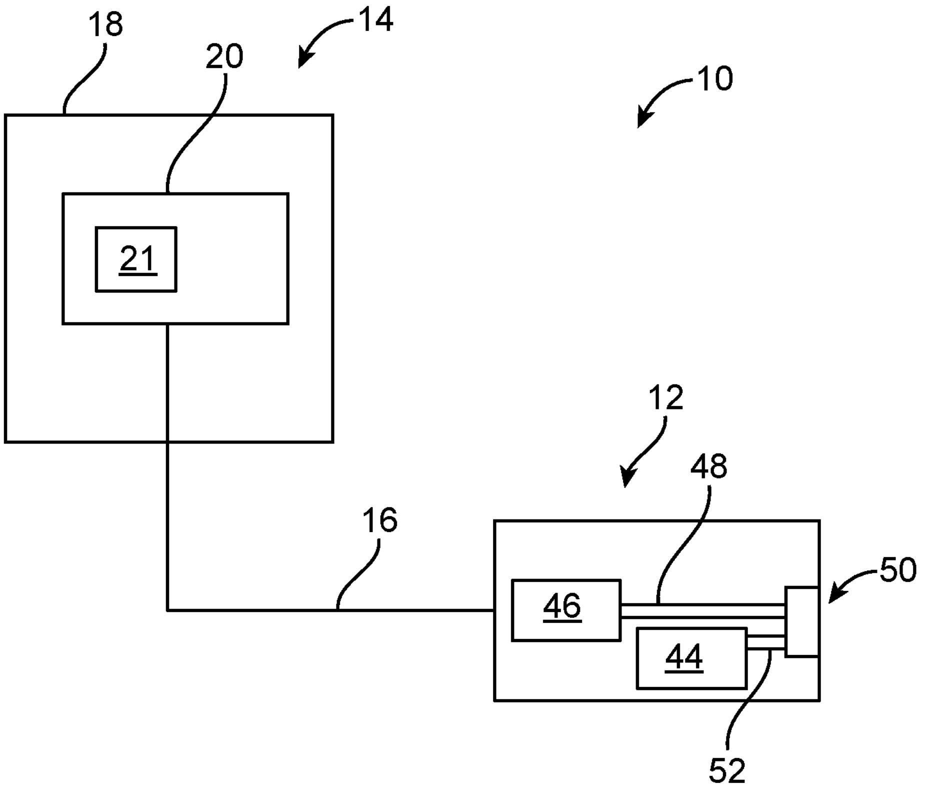
FIG. 8 is a schematic diagram of the hearing device system of FIG. 1.

As shown in FIGS. 7-8, the isolator 36 includes the body 38 and the sleeve 40 disposed on the body. In one or more embodiments, the sleeve 40 is disposed on the side surface 42 of the body 38. In one or more embodiments, the second end 30 of the front housing 24 can be connected to the sleeve 40 of the isolator 36 using any suitable technique. Further, in one or more embodiments, the second end 34 of the rear housing 26 can be connected to the sleeve 40 of the isolator 36 using any suitable technique.

The body 38 of the isolator 36 can take any suitable shape and have any suitable dimensions. In one or more embodiments, the body 38 can include one or more flanges 72 that extend from the side surface 42. The sleeve 40 can be in contact with the flange 72. In one or more embodiments, the sleeve 40 abuts the flange 72.

The body 38 can include any suitable material, e.g., the same materials described herein regarding the front and rear housings 24,26. In one or more embodiments, the body 38 of the isolator 36 includes a thermoplastic elastomer. In one or more embodiments, the body 38 includes the same material as at least one of the front housing 24 or the rear housing 26.

The body 38 of the isolator 36 can exhibit any desirable hardness value. In one or more embodiments, the hardness value of the body 38 is at least 20 durometer Shore 00. In one or more embodiments, the hardness value of the body 38 is no greater than 80 durometer Shore A. Further, the sleeve 40 of the isolator 36 can exhibit any desirable hardness value. In one or more embodiments, the hardness value of the sleeve 40 is at least 10 durometer Shore D. In one or more embodiments, the hardness value of the sleeve 40 is no greater than 100 durometer Shore D. In one or more embodiments, the hardness value of the sleeve 40 of the isolator 36 is greater than the hardness value of the body 38 of the isolator 36.

The sleeve 40 of the isolator 36 can be connected to any suitable portion or portions of the body 38. Although depicted as being connected to the side surface 42, the sleeve 40 can be connected to one or more additional surfaces of the body 38. Further, the sleeve 40 can be connected to the body 38 using any suitable technique, e.g., bonding, adhering including adhesive bonding and adhesive tapes, welding, friction-fitting, snap fitting, etc. In one or more embodiments, the sleeve 40 can be over-molded onto one or more portions of the body 38, e.g., onto the side surface 42 of the body.

The sleeve 40 can be a unitary component or include two or more portions. For example, as shown in FIG. 7, the sleeve 40 includes a first portion 40-1 and a second portion 40-2 (collectively referred to as sleeve 40). The first portion 40-1 can be connected to the front housing 24 and the second portion 40-2 can be connected to the rear housing 26. The flange 72 of the body 38 is disposed between the first portion 40-1 and the second portion 40-2.

The sleeve 40 can also include a first rib 74 and a second rib 76. The first rib 74 extends towards the first end of 28 of the front housing 24 along the enclosure axis 2, and the second rib 76 extends towards the first end 32 of the rear housing 26 along the enclosure axis. Each of the first and second ribs 74,76 can take any suitable shape. In one or more embodiments, the first rib 74 is adapted to be inserted into the second end 30 of the front housing 24 and the second rib 76 is adapted to be inserted into the second end 34 of the rear housing 26. In one or more embodiments, the second end 30 of the front housing 24 can include a slot 78 (FIG.

3) that is adapted to receive the first rib 74 of the sleeve 40. Further, in one or more embodiments, the second end 34 of the rear housing 26 can include a slot 80 that is adapted to receive the second rib 76 of the sleeve 40.

The sleeve 40 of the isolator 36 can also include a first ledge 82 that extends from the first rib 74 to a first perimeter 84 of the sleeve. As shown in FIG. 7, the first ledge 82 is disposed on the first portion 40-1 of the sleeve. Further, the sleeve 40 can also include a second ledge 86 that extends from the second rib 76 to a second perimeter 88 of the sleeve. As is also shown in FIG. 7, the second ledge 86 is disposed on the second portion 40-2 of the sleeve. An end surface 90 (FIG. 3) of the second end 30 of the front housing 24 is adapted to engage the first ledge 82 when the front housing is connected to the isolator 36. Further, an end surface 92 of the second end 34 of the rear housing 26 is adapted to engage the second ledge 86 when the rear housing is connected to the isolator 36.

Figure 9:
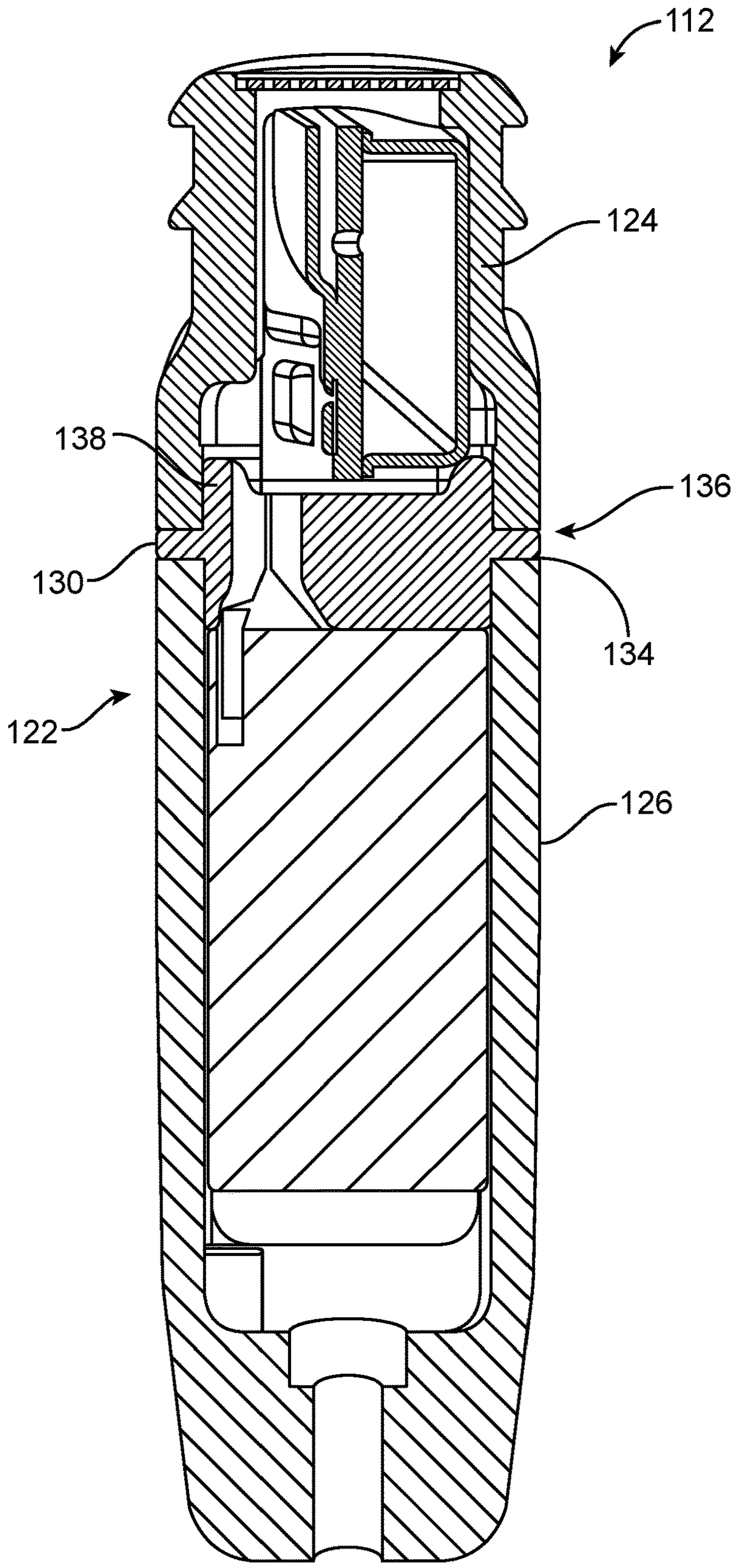
FIG. 9 is a schematic cross-section view of another embodiment of a hearing device that can be utilized with the hearing device system of FIG. 1.

Although the isolator 36 is depicted as including the sleeve 40, in one or more embodiments, the isolator can include only the body 38 disposed between the front housing 24 and the rear housing 26. For example, FIG. 9 is a schematic cross-section view of another embodiment of a hearing device 112. All design considerations and possibilities described herein regarding the hearing device 12 of FIGS. 1-8 apply equally to the hearing device 112 of FIG. 9. The hearing device 112 includes an enclosure 122 that has a front housing 124 and a rear housing 126. The device 112 also includes an isolator 136 disposed between the front housing 124 and the rear housing 126. The isolator 136 includes a body 138.

One difference between the hearing device 112 of FIG. 9 and the hearing device 12 of FIGS. 1-8 is that a second end 130 of the front housing 124 and a second and 134 of the rear housing 126 are connected to the body 138 of the isolator 136 and not to a sleeve (e.g., sleeve 40). The isolator body 138 can take any suitable shape and have any suitable dimensions, e.g., the same shape and dimensions described herein regarding the isolator body 38 of isolator 36 of FIGS. 1-8. Further, the isolator body 138 can include any suitable material, e.g., the same materials described herein regarding the sleeve 40 of isolator 36.

Returning to FIG. 3, the microphone 44 is disposed within the front housing 24. The microphone 44 can be disposed in any suitable location within the front housing 24. In one or more embodiments, the microphone 44 is disposed within the slot 54 disposed in the front housing 24.

The microphone 44 can include any suitable microphone or microphones, e.g., a MEMS microphone, an electret condenser microphone, co-joined microphone sets, etc. In one or more embodiments, the microphone 44 can instead be any suitable sensor or sensors, e.g., at least one of a temperature, optical, or tactile sensor. The microphone 44 is acoustically connected to the opening 50 by the microphone port 52 using any suitable technique. Further, the microphone port 52 can take any suitable shape and have any suitable dimensions. In one or more embodiments, the microphone 44 can include a manifold 95 that extends along the enclosure axis 2 and defines a portion of the acoustic port 48. In one or more embodiments, the microphone port 52 can be nano-coated to resist debris and moisture ingress.

Figure 6:
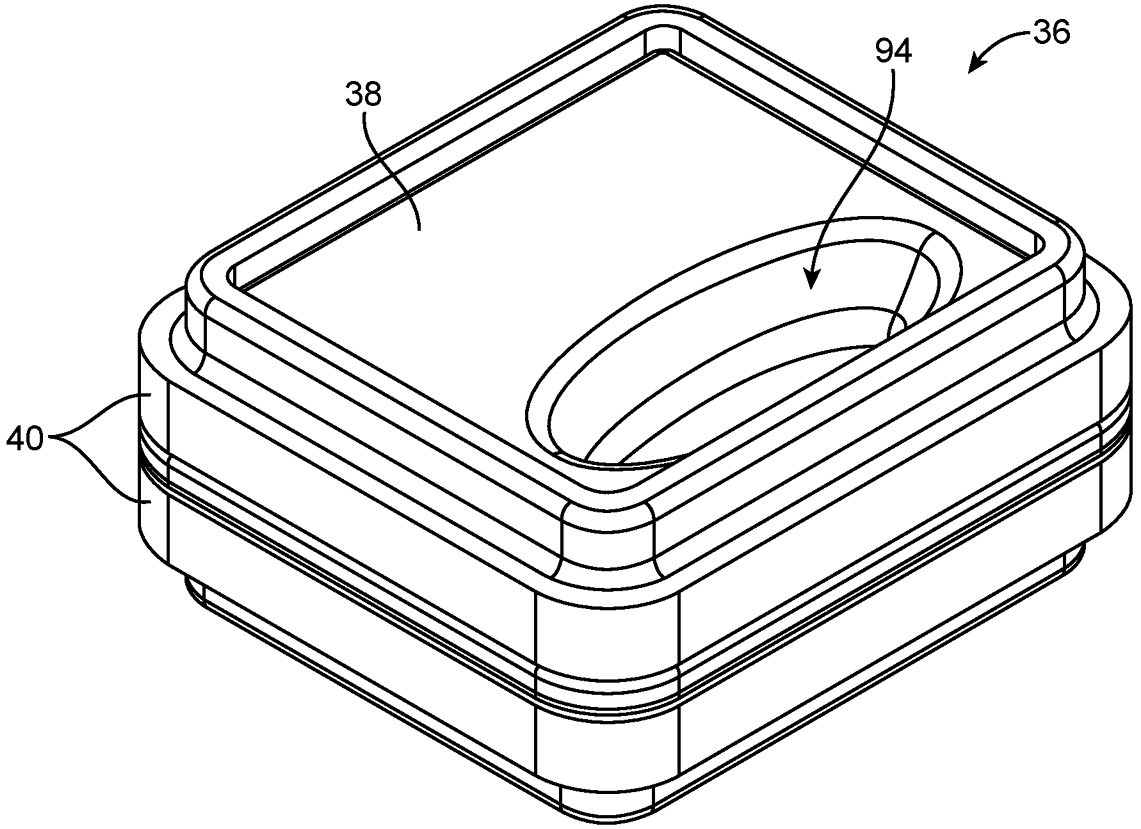
FIG. 6 is a schematic perspective view of an isolator of the hearing device of FIG. 1.

Disposed within the rear housing 26 is the receiver 46. The receiver 46 can be disposed in any suitable location within the rear housing 26. Such receiver 46 can include any suitable receiver or receivers, e.g., a balanced armature speaker, dynamic driver speaker, piezo electric speaker, etc. The receiver 46 is acoustically connected to the opening 50 by the acoustic port 48 that extends through the isolator body 38 between the receiver and the opening. As can be seen in FIG. 6, the body 38 of the isolator 36 includes an opening 94 that forms a portion of the acoustic port 48. In one or more embodiments, the acoustic port 48 can be provided by a tube or other structure that is inserted through the opening 94 of the body 38 of the isolator 36. The acoustic port 48 can take any suitable shape and have any suitable dimensions.

As can be seen, e.g., in FIG. 3, an inlet 96 of the microphone port 52 defines a plane 4 that is orthogonal to the enclosure axis 2. An outlet 98 of the acoustic port 48 can be any suitable distance from the plane 4. In one or more embodiments, the distance between the outlet 98 of the acoustic port 48 and the plane 4 is no greater than 1.2 mm as measured in a direction parallel to the enclosure axis 2. In one or more embodiments, the outlet 98 of the acoustic port 48 is parallel to the inlet 96 of the microphone port 52, i.e., in the same plane 4 as the inlet of the microphone port.

Returning to FIG. 1, the hearing module 14 can be adapted to be disposed between the ear and the skull of the wearer. The hearing module 14 includes the module housing 18 and electronic components 20 (FIG. 8) disposed within the module housing. The electronic components 20 of the hearing module 14 can include any suitable electronic component or circuitry, e.g., at least one of a controller, an integrated circuit, a power source, a microphone, or a speaker (i.e., receiver). In one or more embodiments, the electronic components 20 of the hearing module 14 include a controller 21 that is operatively connected to the hearing device 12 using any suitable technique, e.g., by the cable 16. In one or more embodiments, the electronic components 20 of the hearing module 14 can be electrically connected to the hearing device 12 by the cable 16. Further, in one or more embodiments, the electronic components 20 can be connected to the hearing device 12 by a wireless connection using any suitable wireless technique.

In one or more embodiments, the controller 21 of the hearing module 14 can be adapted to direct a noise canceling signal to the receiver 46 of the hearing device 12 that is based upon a noise signal received from the microphone 44 of the hearing device using any suitable technique. The receiver 46 is adapted to direct a noise canceling acoustic wave into the ear canal of the wearer that is based upon this noise canceling signal from the controller 21. Further, in one or more embodiments, the controller 21 can be adapted to determine the fit of the hearing device 12 in the ear canal of the wearer based on a feedback signal from the microphone 44 of the hearing device 12 in response to a fit-test acoustic wave directed into the ear canal by the receiver 46. In one or more embodiments, the controller 21 is adapted to measure a pulse rate of the wearer based on a pulse signal received from the microphone 44 of the hearing device 12. The pulse signal is based on a pulse detected by the microphone 44 using any suitable technique, e.g., one or more of the techniques described in U.S. Patent Publication No. 2020/0268265 A1, entitled INTEGRATION OF SENSOR-BASED CARDIOVASCULAR MEASURES INTO PHYSICAL BENEFIT MEASURE RELATED TO HEARING INSTRUMENT USE. In one or more embodiments, the controller 21 can be adapted to detect the wearer's voice and provide a signal representative of such voice to the wearer using any suitable technique, e.g., one or more of the techniques described in U.S. Pat. No. 9,699,573, entitled HEARING ASSISTANCE SYSTEM WITH OWN VOICE DETECTION; and U.S. Pat. No. 9,042,586, entitled METHOD AND APPARATUS FOR OWN-VOICE SENSING IN A HEARING ASSISTANCE DEVICE. In one or more embodiments, the controller 21 is adapted to measure an occlusion value of the hearing device 12 in the ear canal based on an occlusion signal received from the microphone 44 of the hearing device in response to an acoustic wave directed into the ear canal by the receiver 46 and detected by the microphone using any suitable technique, e.g., one or more of the techniques described in U.S. Patent Application No. 63/286,780, entitled HEARING DEVICE AND METHOD OF USING SAME. In one or more embodiments, the controller 21 is adapted to detect one or more respiratory sounds of the wearer using any suitable technique, e.g., one or more of the techniques described in U.S. Patent Application No. 63/295,071, entitled EAR-WEARABLE DEVICES AND METHODS FOR RESPIRATORY CONDITION DETECTION AND MONITORING. Further, in one or more embodiments, the controller 21 can be adapted to measure at least one of heartbeat variability, respiration rate, optoacoustic emissions, damage to the tympanic membrane, or canal tissue inflammation.

Figure 10:
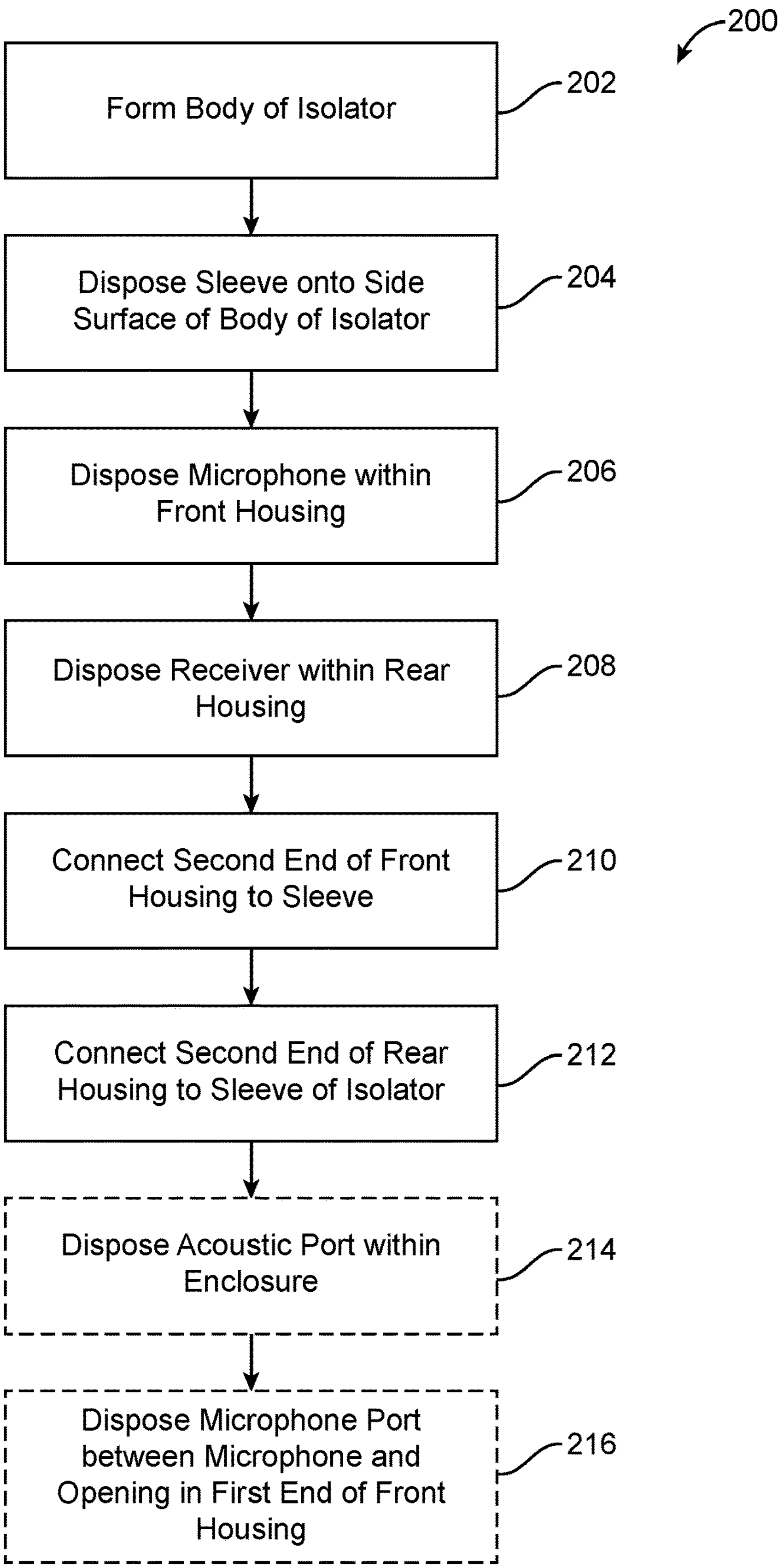
FIG. 10 is a flowchart of a method of forming the hearing device of FIG. 1.

Any suitable technique can be utilized to form the various embodiments of hearing devices described herein. For example, FIG. 10 is a flowchart of one embodiment of a method 200 of forming the hearing device 12. Although described regarding the hearing device 12 of FIGS. 1-8, the method 200 can be utilized to form any suitable hearing device.

At 202, the body 38 of the isolator 36 can be formed using any suitable technique, e.g., molding. The sleeve 40 can be disposed on the body 38 (e.g., on the side surface 42 of the body) of the isolator 36 at 204 using a suitable technique, e.g., the sleeve can be over-molded onto the body of the isolator. Although not shown, in one or more embodiments, the opening 94 can be disposed through the body 38 of the isolator 36 using any suitable technique. Further, the microphone 44 can be disposed within the front housing 24 (e.g., at least partially within the slot 54 formed in the inner surface 56 of the front housing) at 206. At 208, the receiver 46 can be disposed within the rear housing 26. The second end 30 of the front housing 24 can be connected to the sleeve 40 of the isolator 36 at 210 using any suitable technique. For example, in one or more embodiments, the end surface 90 of the front housing 24 can be adhered to the rib 74 of the first portion 40-1 of the sleeve 40 using any suitable adhesive. Further, at 212, the second end 34 of the rear housing 26 can be connected to the sleeve 40 of the isolator 36 using a suitable technique. For example, in one or more embodiments, the end surface 92 of the second end 34 of the rear housing 26 can be adhered to the rib 76 of the second portion 40-2 of the sleeve 40 using any suitable adhesive. At 214, the acoustic port 48 can optionally be disposed within the enclosure 22 using any suitable technique. The acoustic port 48 can be inserted through the opening 94 of the isolator 36. In one or more embodiments, the acoustic port is formed by one or more portions of the front and rear housing 24, 26 and the isolator 36. Further, at 216, the microphone port 52 can optionally be disposed between the microphone 44 and the opening 50 in the first end 28 of the front housing 24 using any suitable technique.

Figure 11:
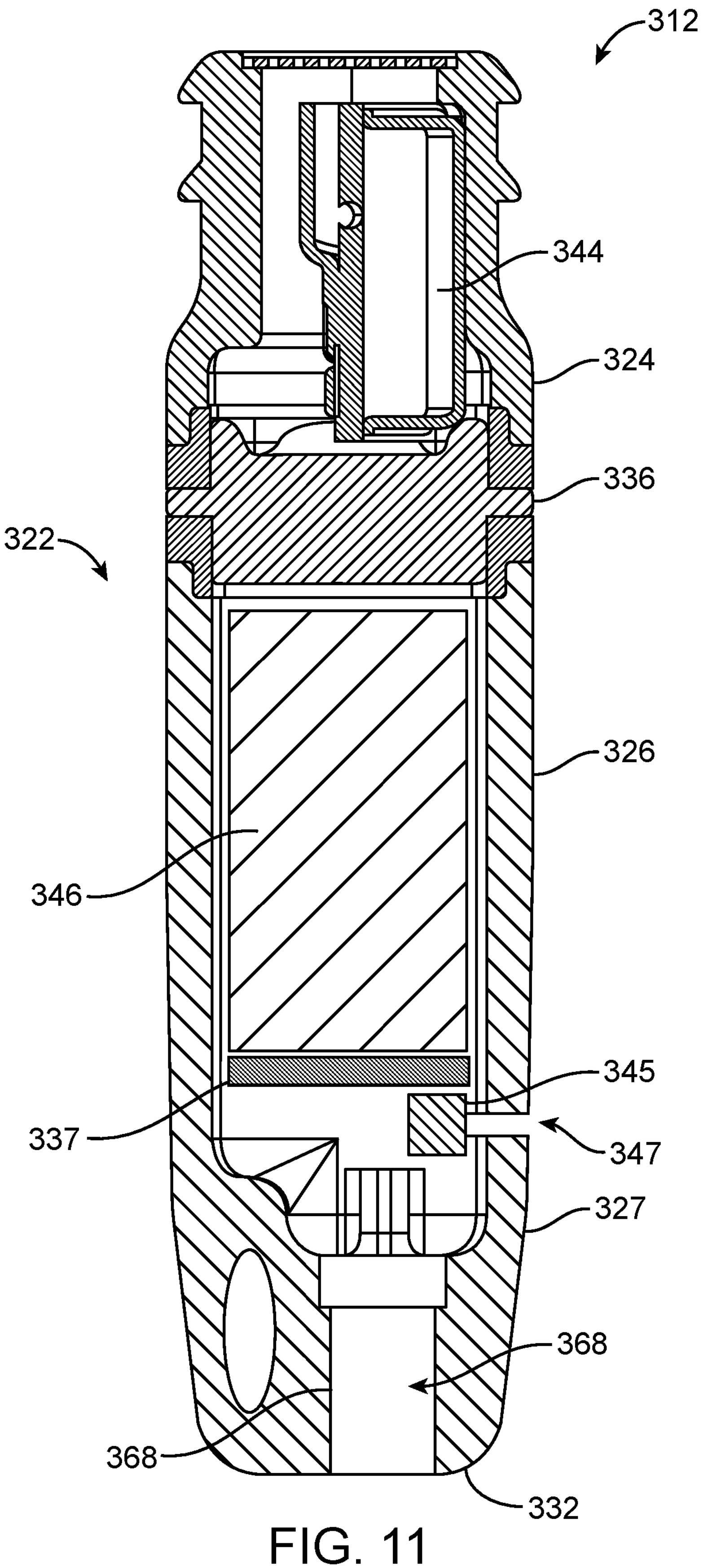
FIG. 11 is a schematic cross-section view of another embodiment of a hearing device that can be utilized with the hearing device system of FIG. 1.

The various embodiments of hearing devices described herein can include any suitable number of sensors (e.g., microphones) disposed in any suitable location on or within a housing of the device. For example, FIG. 11 is a schematic cross-section view of another embodiment of a hearing device 312. All design considerations and possibilities described herein regarding the hearing device 12 of FIGS. 1-8 and the hearing device 112 of FIG. 9 apply equally to the hearing device 312 of FIG. 11. Further, the hearing device 312 can be utilized with any suitable hearing device system, e.g., hearing device system 10 of FIG. 1.

One difference between hearing device 312 and hearing devices 12 and 112 is that a sensor (e.g., microphone) 344 is disposed in a front housing 324 of an enclosure 322 of the device and a second sensor (e.g., microphone) 345 is disposed in a rear housing 326 of the enclosure. Each of the sensors 344, 345 can include any suitable sensor, e.g., microphone 44 of hearing device 12 of FIGS. 1-8. In one or more embodiments, the sensor 344 can include a microphone and the second sensor 345 can include a sensor other than a microphone. In one or more embodiments, the sensor 344 can include a sensor other than a microphone and the second sensor 345 can include a microphone. In one or more embodiments, each of the sensors 344, 345 is a microphone.

The second sensor 345 can be connected to an ambient environment of the hearing device 312 using any suitable technique. In one or more embodiments, the second sensor 345 can be connected to the ambient environment by a port 347 that extends between the second sensor and a side surface 327 of the rear housing 326. The port 347 can be disposed in any suitable location. In one or more embodiments, the port 347 can extend between the second sensor 345 and a first end 332 of the rear housing 326.

The second sensor 345 can be connected to any device or component disposed on or within the enclosure 322 or on or within a hearing module (e.g., hearing module 14 of FIG. 1) using any suitable technique. In one or more embodiments, the second sensor 345 can be electrically connected to one or more devices or components disposed within an external hearing module via a cable (e.g., cable 16 of FIG. 1) that is connected to the hearing module and the hearing device 312 via a connector port 368.

The hearing device 312 also includes an isolator 336 disposed between the front housing 324 and the rear housing 326. The isolator 336 can include any suitable isolator described herein, e.g., isolator 36 of FIGS. 1-8. The hearing device 312 also includes a receiver 346 disposed within the rear housing 326. The receiver 346 can include any suitable receiver described herein, e.g., receiver 46 of FIGS. 1-8. The receiver 346 can be isolated from the sensor 344 by the isolator 336, which is disposed between the receiver the sensor. Further, the receiver 346 can be isolated from the second sensor 345 using any suitable technique. In one or more embodiments, the hearing device 312 can include a second isolator 337 disposed in any suitable location within the rear housing 326. The second isolator 337 can include any suitable isolator, e.g., isolator 336. In one or more embodiments, the receiver 346 can be disposed in the front housing 324 and isolated from the second sensor 345 by the isolator 336. In such embodiment, the receiver 346 can be isolated from the sensor 344 using any suitable technique.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A hearing device comprising:

an enclosure extending along an enclosure axis and comprising a front housing and a rear housing, wherein the front housing extends along the enclosure axis between a first end and a second end, and further wherein the rear housing extends along the enclosure axis between a first end and a second end;

an isolator disposed between the front housing and the rear housing, wherein the isolator comprises a body and a sleeve disposed on a side surface of the body, wherein the second end of the front housing and the second end of the rear housing are connected to the sleeve of the isolator, wherein the body of the isolator comprises at least one of a thermoplastic polymer, thermoset polymer, thermoplastic elastomer, or photopolymer;

a microphone disposed in the front housing;

a receiver disposed in the rear housing;

an acoustic port that extends through the isolator body between the receiver and an opening disposed in the first end of the front housing, wherein the acoustic port acoustically connects the receiver to the opening; and a microphone port that extends between the microphone and the opening disposed in the first end of the front housing, wherein the microphone port acoustically connects the microphone to the opening.

2. The device of claim 1, wherein the isolator comprises a flange that extends from the side surface, wherein the sleeve is in contact with the flange.

3. The device of claim 2, wherein the sleeve comprises a first portion that is connected to the front housing and a second portion that is connected to the rear housing, wherein the flange is disposed between the first portion and the second portion of the sleeve.

4. The device of claim 1, wherein the body of the isolator comprises a hardness value of at least 20 durometer Shore 00 and no greater than 80 durometer Shore A.

5. The device of claim 1, wherein a hardness value of the sleeve of the isolator is greater than a hardness value of the body of the isolator.

6. The device of claim 1, wherein the sleeve of the isolator further comprises a first rib that extends toward the first end of the front housing along the enclosure axis, wherein the first rib is adapted to be inserted into the second end of the front housing.

7. The device of claim 6, wherein the sleeve of the isolator further comprises a second rib extending toward the first end of the rear housing along the enclosure axis, wherein the second rib is adapted to be inserted into the first end of the rear housing.

8. The device of claim 7, wherein the sleeve of the isolator further comprises:

a ledge that extends from the first rib to a perimeter of the sleeve, wherein an end surface of the second end of the front housing is adapted to engage the ledge; and a second ledge that extends from the second rib to the perimeter of the sleeve, wherein an end surface of the second end of the rear housing is adapted to engage the ledge.

9. The device of claim 1, wherein an inlet of the microphone port defines a plane that is orthogonal to the enclosure axis, wherein a distance between an outlet of the acoustic port and the plane is no greater than 1.2 mm as measured in a direction parallel to the enclosure axis.

10. The device of claim 1, wherein the microphone further comprises a manifold that extends along the enclosure axis and defines a portion of the acoustic port.

11. A hearing device system comprising:

a hearing device comprising:

an enclosure extending along an enclosure axis and comprising a front housing and a rear housing, wherein the front housing extends along the enclosure axis between a first end and a second end, and further wherein the rear housing extends along the enclosure axis between a first end and a second end;

an isolator disposed between the front housing and the rear housing, wherein the isolator comprises a body and a sleeve disposed on a side surface of the body, wherein the second end of the front housing and the second end of the rear housing are connected to the sleeve of the isolator, wherein the body of the isolator comprises at least one of a thermoplastic polymer, thermoset polymer, thermoplastic elastomer, or photopolymer;

a microphone disposed in the front housing;

a receiver disposed in the rear housing;

an acoustic port that extends between the receiver and an opening disposed in the first end of the front housing, wherein the acoustic port acoustically connects the receiver to the opening; and a microphone port that extends between the microphone and the opening disposed in the first end of the front housing, wherein the microphone port acoustically connects the microphone to the opening;

a hearing module adapted to be disposed between an ear and a skull of a wearer, wherein the hearing module comprises a module housing and electronic components disposed within the module housing; and a cable that connects the hearing device to the hearing module.

12. The system of claim 11, wherein the electronic components of the hearing module comprise a controller that is operatively connected to the hearing device.

13. The system of claim 12, wherein the controller is adapted to direct a noise canceling signal to the receiver of the hearing device that is based upon a noise signal received from the microphone of the hearing device, wherein the receiver is adapted to direct a noise canceling acoustic wave into an ear canal of the wearer of the hearing device that is based upon the noise canceling signal from the controller.

14. The system of claim 12, wherein the controller is adapted to determine a fit of the hearing device in an ear canal of the wearer based upon a feedback signal from the microphone of the hearing device in response to a fit-test acoustic wave directed into the ear canal by the receiver.

15. The system of claim 12, wherein the controller is adapted to measure a pulse rate of the wearer based upon a pulse signal received from the microphone of the hearing device, wherein the pulse signal is based upon a pulse detected by the microphone.

16. The system of claim 12, wherein the controller is adapted to measure an occlusion value of the hearing device in an ear canal of the wearer based upon an occlusion signal received from the microphone of the hearing device in response to an acoustic wave directed into the ear canal by the receiver and detected by the microphone.

17. A method comprising:

forming a body of an isolator;

disposing a sleeve onto a side surface of the body of the isolator;

disposing a microphone within a front housing, wherein the front housing comprises a first end and a second end;

disposing a receiver within a rear housing, wherein the rear housing comprises a first end and a second end;

connecting the second end of the front housing to the sleeve of the isolator; and connecting the second end of the rear housing to the sleeve of the isolator, wherein the front housing, the isolator, and the rear housing define an enclosure that extends along an enclosure axis.

18. The method of claim 17, wherein forming the body of the isolator comprises molding the body of the isolator.

19. The method of claim 17, wherein disposing a sleeve onto the side surface of the body of the isolator comprises over-molding the sleeve onto the side surface of the body of the isolator.

20. A hearing device comprising:

an enclosure extending along an enclosure axis and comprising a front housing and a rear housing, wherein the front housing extends along the enclosure axis between a first end and a second end, and further wherein the rear housing extends along the enclosure axis between a first end and a second end;

an isolator disposed between the front housing and the rear housing, wherein the isolator comprises:

a body and a sleeve disposed on a side surface of the body, wherein the second end of the front housing and the second end of the rear housing are connected to the sleeve of the isolator; and a flange that extends from the side surface of the body, wherein the sleeve is in contact with the flange;

a microphone disposed in the front housing;

a receiver disposed in the rear housing;

an acoustic port that extends through the isolator body between the receiver and an opening disposed in the first end of the front housing, wherein the acoustic port acoustically connects the receiver to the opening; and a microphone port that extends between the microphone and the opening disposed in the first end of the front housing, wherein the microphone port acoustically connects the microphone to the opening.

21. The device of claim 20, wherein the sleeve comprises a first portion that is connected to the front housing and a second portion that is connected to the rear housing, wherein the flange is disposed between the first portion and the second portion of the sleeve.

22. A hearing device comprising:

an enclosure extending along an enclosure axis and comprising a front housing and a rear housing, wherein the front housing extends along the enclosure axis between a first end and a second end, and further wherein the rear housing extends along the enclosure axis between a first end and a second end;

an isolator disposed between the front housing and the rear housing, wherein the isolator comprises a body and a sleeve disposed on a side surface of the body, wherein the second end of the front housing and the second end of the rear housing are connected to the sleeve of the isolator;

a receiver disposed in the rear housing;

an acoustic port that extends through the isolator body between the receiver and an opening disposed in the first end of the front housing, wherein the acoustic port acoustically connects the receiver to the opening;

a microphone disposed in the front housing and comprising a manifold that extends along the enclosure axis and defines a portion of the acoustic port; and a microphone port that extends between the microphone and the opening disposed in the first end of the front housing, wherein the microphone port acoustically connects the microphone to the opening.

* * * * *